United States Patent [19]

Kobrinski

[11] Patent Number: 4,821,255
[45] Date of Patent: Apr. 11, 1989

[54] CROSS-CONNECTION OF WAVELENGTH-DIVISION-MULTIPLEXED HIGH SPEED OPTICAL CHANNELS

[75] Inventor: Haim Kobrinski, Byram Township, Sussex County, N.J.

[73] Assignee: Bell Communications Research, Inc., Livingston, N.J.

[21] Appl. No.: 46,911

[22] Filed: May 6, 1987

[51] Int. Cl.[4] .............................................. H04B 9/00
[52] U.S. Cl. ...................................... 370/3; 455/601; 455/617; 350/96.19
[58] Field of Search ................. 370/1, 3, 57; 455/601, 455/607, 617, 600, 606; 350/96.19, 96.18

[56] References Cited

FOREIGN PATENT DOCUMENTS

| 0033149 | 8/1981 | European Pat. Off. ............... 370/57 |
| 3239593 | 6/1984 | Fed. Rep. of Germany .......... 370/3 |
| 0051633 | 3/1984 | Japan ........................................ 370/3 |
| 2043240 | 10/1980 | United Kingdom ..................... 370/3 |

OTHER PUBLICATIONS

"Applications of Coherent Optical Communications in the Network Environment," Proc. SPIE, H. Kobrinski, vol. 568, pp. 42-49, San Diego, 1985.

"Wavelength Division Multiplexing/Demultiplexing (WDM) Using Diffraction Gratings," Proc. SPIE, J. P. Laude and J. M. Lerner, vol. 503, pp. 22-28, San Diego, Aug. 1986.

"68.3 km Transmission which 1.37 Tbit km/s Capacity Using Wavelength Division Multiplexing of Ten Single-Frequency Lasers at 1.5 um," Elect. Lett., N. A. Olsson et al., vol. 21, pp. 105-106, 1985.

"Wavelength Controllability of VPE Grown 1.3 $\mu$m DFB Lasers for Wavelength Multiplexing Optical Fiber Communication, " IOOC-ECOC Tech. Digest, H. Okuda et al., vol. 1, pp. 29-32, Oct. 1985, Venice, Italy.

"Strictly Nonblocking 8×8 Integrated-Optic Switch Matrix in Ti:LiNbO$_3$," Integrated and Guide-Wave Optics Tech. Digest, P. Ganestrand et al., pp. 4-5, Feb. 1986, Atlanta.

Primary Examiner—Benedict V. Safourek
Assistant Examiner—Andrew J. Telesz, Jr.
Attorney, Agent, or Firm—James W. Falk

[57] ABSTRACT

A wavelength division multiplexing structure for establishing dedicated high bit rate point-to-point connections between network nodes is disclosed. The information transmitted out of any given network node is modulated on a plurality of wavelengths according to destination. These wavelengthds are multiplexed and transmitted to the network hub. At the hub, all the different wavelengths from all the nodes are demultiplexed, passively rearranged, multiplexed again and transmitted to the appropriate destinations. The information handling capacity of this structure exceeds 1 Terabit/second.

11 Claims, 2 Drawing Sheets

WAVELENGTH ALLOCATION FOR N = 4

CROSS-CONNECTION OF WAVELENGTH-DIVISION-MULTIPLEXED HIGH SPEED OPTICAL CHANNELS

FIELD OF THE INVENTION

This invention relates to an optical telecommunications network and, more particularly, to a wavelength division multiplexing structure for establishing high speed dedicated point-to-point connections between the nodes of a telecommunications network.

BACKGROUND OF THE INVENTION

In a typical telecommunications network based on wire cable, the switching nodes (e.g., central offices) are interconnected using a dedicated mesh architecture with limited switching. This means that there is a dedicated wire cable link extending between each pair of nodes in the network.

With the introduction into the network of optical communications technology including single mode optical fibers, a more efficient, flexible and economical utilization of the relatively large available bandwidth can be achieved using a central hub architecture. In such a hub architecture, each of the switching nodes or central offices is connected to a central hub switch by means of an optical fiber link.

Generally, the hub switch itself is an electronic switch. Thus optical signals are transmitted to the hub switch via the optical fibers and are converted from optical to electronic form for processing in the hub switch. The signals processed in the hub switch are then reconverted back to optical form for transmission out of the hub switch. Because of inherent switching speed limitations characteristic of the electronic switching devices comprising an electronic hub switch, current electronic hub switches cannot process incoming data channels at rates faster than a few hundred megabits per second. This is only a fraction of the bandwidth that is required for the broad band applications, such as high definition video and interactive data communications, presently under contemplation for telecommunications networks. Such applications are expected to require data throughputs at individual subscriber stations in excess of 100 Gigabits per second and communications between switching nodes or central offices are expected to require data throughputs in the Terabit per second range.

Accordingly, efforts have been directed toward the development of optical telecommunications networks which utilize an optical central hub instead of an electronic central hub. An optical central hub provides the needed high data throughputs and eliminates the need for conversion of data from optical to electronic form and reconversion back to optical form.

Examples of such all optical networks are described in Cheung-Kobrinski-Loh U.S. patent application Ser. No. 948,244, entitled "Multiwavelength Optical Telecommunication System," filed Dec. 31, 1986 and now abandoned and Arthurs-Goodman-Kobrinski-Vecchi U.S. patent application Ser. No. 046,912 entitled "Optical Cross-Connect for Parallel Processing Computers" filed on May 6, 1987. Both applications are assigned to the assignee hereof. The Cheung-Kobrinski-Loh patent application describes a network in which each node has a transmitting system capable of transmitting radiation at a unique wavelength associated with the particular node. Each node also has a receiving system capable of receiving all of the wavelengths produced by the various transmitting systems in the network. A passive central optical hub element is adapted to receive radiation over optical fiber links at a different wavelength from each of the transmitting systems. The central hub element also transmits over optical fiber links a fraction of the power received at each wavelength to all receiving systems. Thus, each node receives a fraction of the power transmitted by every other node. The receiving system at each node is tunable to a given one of the wavelengths transmitted thereto so that communications between pairs of nodes in the network can be achieved. Illustratively, each receiving system may comprise a tunable optical heterodyne receiver. Alternatively, each receiving system may comprise a wavelength division demultiplexer for separating the arriving wavelengths and a dedicated detector for each wavelength. A control system is provided for selectively activating one of the detectors.

The above-described network is especially suitable for applications such as wideband broadcasting and multicasting services and for the setting up and tearing down of wideband virtual connections. However, the above-described network is not particularly well suited for the establishment of very high capacity (e.g., total throughput in the Terabit/sec range) dedicated point-to-point connections between particular pairs of nodes. In particular, a hub element capable of transmitting a fraction of the power from each transmitting system to all receiving systems and receiving systems capable of tuning to a selected wavelength represent an unneeded investment in network hardware when the objective is to provide very high capacity dedicated point-to-point connections between nodes.

One network architecture which is suited for providing very high capacity dedicated point-to-point connections is an optical mesh architecture in which there is a dedicated optical fiber link between each pair of nodes in the network. However, such a mesh architecture requires a massive deployment of optical fibers and in addition such a mesh architecture cannot be provided by upgrading presently in place optical fiber networks based on electronic hub switches.

In view of the above, it is an object of the present invention to provide an optical network architecture suitable for providing dedicated very high capacity point-to-point connections. More particularly, it is an object of the invention to provide an optical network architecture suitable for providing dedicated point-to-point connections with data transmission capabilities in the Terabit/sec range and suitable for broad bandwidth services such as high definition video and interactive data communications. It is a further object of the present invention to provide such dedicated high bit rate point-to-point connections by way of a hub topology so that the fiber links in already existing optical hub networks can be utilized and no massive deployment of optical fibers is required.

SUMMARY OF THE INVENTION

The present invention is a wavelength division multiplexing (WDM) structure for establishing very high throughput dedicated point-to-point connections between the nodes of a telecommunications network comprising N nodes. Illustratively, each of the nodes is a central office and the network is an interoffice (i.e., exchange) network.

Typically, each of the N nodes in the network produces up to N distinct wavelengths, each of the wavelengths being modulated with information to be transmitted to a different destination node. These wavelengths are wavelength multiplexed and transmitted to a central hub by way of a fiber link. The central hub is especially adapted for setting up very high speed dedicated point-to-point connections between network nodes. At the hub, all the different wavelengths from all the incoming fiber links are wavelength demultiplexed. Upon wavelength demultiplexing, all of the wavelengths are spatially grouped according to node of origin. The wavelengths are then passively rearranged according to destination node. Wavelengths to be transmitted to the same destination are then multiplexed together and transmitted to the appropriate destination by way of an optical fiber link. In this way high throughput dedicated point-to-point connections between the nodes in the network are established.

More particularly, in an illustrative embodiment of the invention, each of the N node includes a transmitting system capable of outputting information channels (i.e., data streams) destined for the other nodes in the network. Each node also includes a receiving system. Information channels transmitted out of any given node in the network are ordered according to their destinations (there are N possible destination nodes) and assigned corresponding wavelengths which are modulated with the information of the particular channel. Thus, up to N distinct wavelengths are transmitted by each transmitting system, each wavelength carrying information to be transmitted to a different destination node. Each of the transmitting systems includes a wavelength division multiplexer which is used to multiplex the wavelengths transmitted therefrom. The wavelength multiplexed radiation transmitted out of each node is transmitted by way of a optical fiber link to an central hub.

As previously indicated, the central hub is especially suited for providing dedicated point-to-point connections between particular pairs of network nodes. The hub includes N wavelength division demultiplexers. There is one wavelength division demultiplexer connected to the transmitting system of each of the N nodes by way of an optical fiber link. The hub also includes N wavelength division multiplexers. There is one wavelength division multiplexer connected to the receiving system in each of the N nodes by way of an optical fiber link.

In the hub, the wavelength multiplexed radiation arriving from the N transmitting systems is demultiplexed using the corresponding wavelength division demultiplexers. At this point the individual wavelengths are spatially grouped according to node of origin. The demultiplexed wavelengths are then spatially regrouped according to destination node. All of the wavelengths destined for the same destination node are then multiplexed together by the wavelength division multiplexer associated with the receiving system of the destination node. The re-multiplexed radiation is then transmitted to the receiving system of the appropriate destination node by means of the appropriate optical fiber link.

At first glance it would appear that a network of the type described above requires $N^2$ distinct wavelengths, i.e., one wavelength for each possible dedicated point-to-point connection. However, as is explained in more detail below, in a network with N nodes, the equivalent of N spatially separate fiber paths is provided. Thus, each wavelength may be allocated for N different point-to-point connections so that a network with N nodes and $N^2$ possible point-to-point connections requires no more than N distinct wavelengths.

The information handling capacity of the inventive network exceeds one Terabit/second. This throughput can be duplicated only by a complete fiber mesh architecture, which utilizes individual fiber links between all pairs of nodes. Advantageously, the inventive structure provides very high capacity dedicated point-to-point connections between nodes without such massive deployment of fibers.

In short, the inventive network is an all optical telecommunications network which comprises a wavelength multiplexing structure that allows for high throughput dedicated point-to-point connections between nodes. The inventive network does not require electronic switching of high bit rate data streams and does not require massive fiber deployment as a mesh architecture would. In addition, the transport of multiple Terabit/second loads is achieved in a manner transparent to the data structure. Thus, the inventive network may be utilized in connection with packet and/or circuit type systems. Accordingly, the inventive network architecture provides an attractive alternative for upgrading previously existing fiber networks that are implemented in a hub topology when massive broadband services are widely introduced into the public telecommunications network.

DETAILED DESCRIPTION

Figure 1:
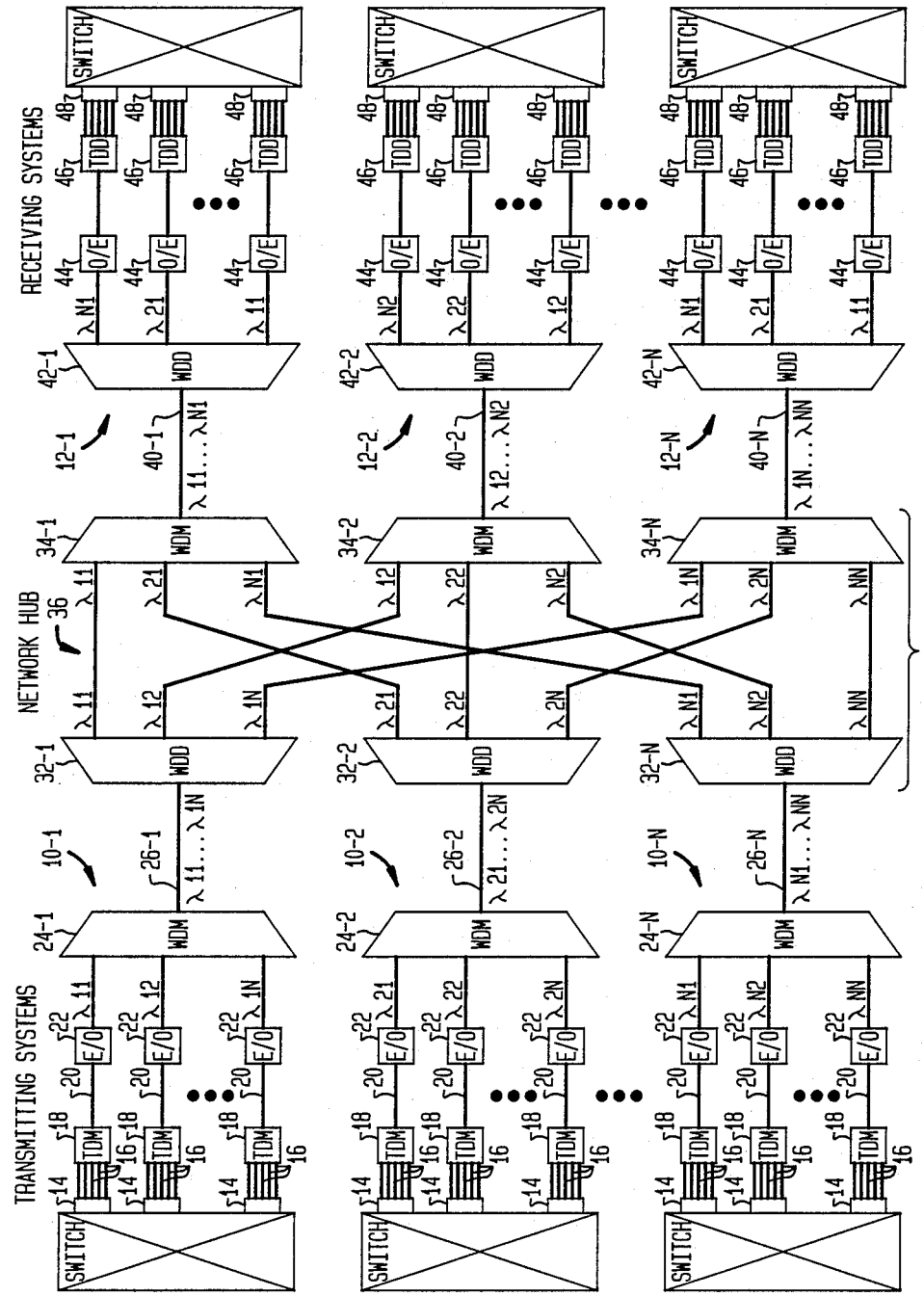
FIG. 1 is a schematic diagram of an optical telecommunications network in accordance with an illustrative embodiment of the invention.

Turning to FIG. 1, an optical telecommunications network comprising N nodes is illustrated. Illustratively each node is a central office and the network is an interoffice or exchange network. Each node comprises a transmitting system and a receiving system. For purposes of clarity, the transmitting systems are designated 10-1, 10-2 ... 10-N and are located at the left hand side of FIG. 1. The receiving systems are designated 12-1, 12-2 ... 12-N and are located at the right hand side of FIG. 1. However, in an actual network the transmitting system and receiving system of a node are in close physical proximity. For example, the Nth node comprises the transmitting system 10-N and the receiving system 12-N. The main purpose of the network architecture described in detail below is to provide high speed dedicated point-to-point connections between particular transmitting systems and particularly receiving systems.

Each of the transmitting systems includes a plurality of output ports 14. Each of the output ports 14 outputs a plurality of low bit rate channels 16 in electronic form. The channels 16 are grouped according to destination, i.e., all of the channels to be transmitted to the same receiving system are grouped together. Illustratively, each of the channels 16 has a bit rate of 150 megabits/sec. Each group of channels 16 from each output port 14 is multiplexed together using the conventional electronic time division multiplexers 18 to form a higher bit rate electronic channel 20. Illustratively, each of the channels 20 has a bit rate of 2.4 Gigabits/sec. Each output channel 20 comprises data to be transmitted to one receiving system. The channels 20 are converted from electronic to optical form by means of the conventional electronic-to-optical converters 22. Each of the data channels 20 is modulated onto a corresponding wavelength. Up to N distinct wavelengths are produced by each transmitting systems, with each distinct wavelength carrying information destined for a distinct receiving system.

In FIG. 1, these wavelengths are designated $\lambda 11$, $\lambda 12$ ... $\lambda 1N$, $\lambda 21$, $\lambda 22$ ... $\lambda 2N$, In each case, the first subscript designates the node of origin and the second subscript designates the destination node. Thus, wavelength $\lambda KM$ originates at node K and is to be transmitted to node M. The wavelengths produced in each transmitting system 10-1, 10-2, ... 10-N are wavelength division multiplexed by means of the wavelength division multiplexers 24-1, 24-2 ... 24-N respectively.

Each of the transmitting systems 10-1, 10-2 ... 10-N (more particularly, each of the wavelength division multiplexers 24-1, 24-2 ... 24-N) is connected to a central hub 30 by means of a corresponding single mode optical fiber link 26-1, 26-2 ... 26-N. For example, the fiber link 26-1 carries the multiplexed radiation comprising the wavelengths $\lambda 11$, $\lambda 12$ ... $\lambda 1N$ and the fiber link 26-N carries the multiplexed radiation comprising the wavelengths $\lambda N1$, $\lambda N2$ ... $\lambda NN$.

The central hub comprises a set of wavelength division demultiplexers (WDD) 32-1, 32-2 ... 32-N and a set of wavelength division multiplexers (WDM) 34-1, 34-2 ... 34-N. Each of the wavelength division demultiplexers 32-1, 32-2 ... 32-N is associated with a corresponding transmitting system 10-1, 10-2 ... 10-N respectively. Similarly, each wavelength division multiplexer 34-1, 34-2 ... 34-N is associated with a corresponding receiving system 12-1, 12-2 ... 12-N, respectively.

More particularly, each of the fiber links 26-1, 26-2 ... 26-N serves to connect one of the wavelength division multiplexers 24-1, 24-2 ... 24-N with the corresponding wavelength division demultiplexer 32-1, 32-2 ... 32-N, respectively. At the hub 30, the wavelength division demultiplexers 32-1, 32-2 ... 32-N separate the multiplexed radiation carried by the fiber links 26-1, 26-2 ... 26-N into the constituent wavelengths. After demultiplexing, the wavelengths are grouped spatially according to node of origin. The fiber links 36 are then used to spatially rearrange the wavelengths according to destination. All wavelengths destined for a particular receiving system 12-1, 12-2 ... 12-N are transmitted by means of the fiber links 36 to the associated wavelength division multiplexer 34-1, 34-2 ... 34-N. All of the wavelengths destined for a particular receiving system are then multiplexed and transmitted to the appropriate receiving systems 12-1, 12-2 ... 12-N over the corresponding optical fiber link 40-1, 40-2 ... 40-N.

The hub 30 may be understood in more detail as follows. Each of the wavelength division demultiplexers 32-1 ... 32-N receives radiation from one transmitting system. This radiation comprises a plurality of wavelengths, with each wavelength being destined for a distinct receiving system. Thus for example, at the output of the wavelength division demultiplexer 32-1, the wavelengths $\lambda 11$, $\lambda 12$ ... $\lambda 1N$ are present. These wavelengths all originate at the transmitting system 10-1 and are destined for the receiving systems 12-1, 12-2 ... 12-N respectively. Similarly, at the output of the wavelength division demultiplexer 32-N, the wavelengths $\lambda N1$, $\lambda N2$ ... $\lambda NN$ are present. These wavelengths all originate at the transmitting system 10-N and are destined for the receiving systems 12-1, 12-2 ... 12-N, respectively. In other words at the outputs of the wavelength division demultiplexers 32, the wavelengths are grouped according to node of origin. The fibers 36 rearrange these wavelengths so that at the inputs to the wavelength division multiplexers 34-1, 34-2 ... 34-N, the wavelengths are grouped according to destination. Thus, at the input to the wavelength division multiplexer 34-1 the wavelengths $\lambda 11$, $\lambda 21$ ... $\lambda N1$ are present, all of which are destined for the receiving system 12-1. Similarly, at the input of the wavelength division multiplexer 34-N, the wavelengths 34-N, the wavelengths $\lambda 1N$, $\lambda 2N$ ... $\lambda NN$ are present, all of which are destined for the receiving system 12-N.

Multiplexed radiation arrives at the receiving systems 12-1, 12-2 ... 12-N by way of the corresponding fiber links 40-1, 40-2 ... 40-N. This radiation is demultiplexed using the wavelength division demultiplexers 42-1, 42-2 ... 42-N. The demultiplexed radiation is then converted from optical to electronic form using the detectors 44. The resulting bit streams are time division demultiplexed using the conventional time division demultiplexers 46 so that the input ports 48 receive lower bit rate channels of, for example, 150 Mbits/sec.

At first look it appears that for N nodes, $N^2$ different wavelengths are required, one wavelength for each of the $N^2$ possible connection paths shown in FIG. 1. However, in the network architecture of FIG. 1 a given transmitting system such as the Kth requires only that all wavelengths associated with the given transmitting system $\lambda Kj$ $j=1,2,3$ ... N be different. In addition, a given receiving system such as the Mth requires only that all wavelengths associated with the given receiving system $\lambda iM$ $i=1, 2\ 3$ ... N be different. These conditions arise because the network of FIG. 1 provides the equivalent of N spatially separate channels. As a result, each of N wavelengths may be used in each of the N separate spatial channels. Thus, only N distinct wavelengths are needed for the $N^2$ possible connection paths among the N nodes. As a result of this, all the wavelength division multiplexers and demultiplexers are identical. They are physically identical because they multiplex or demultiplex the same set of wavelengths. In contrast, if $N^2$ distinct wavelengths are utilized, 2N distinct WDM mux/demux pairs are required.

Figure 2:
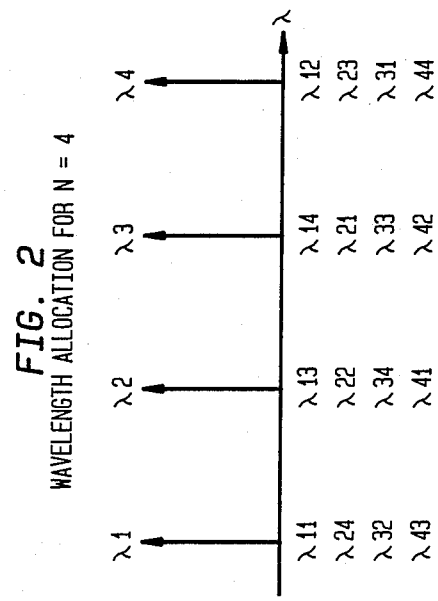
FIG. 2 shows how optical wavelengths may be allocated in the network of FIG. 1, when N=4.

The reduction in the number of wavelengths (relative to the generic structure of FIG. 1) is illustrated for the case of N=4 nodes in FIG. 2. Thus, for example, $\lambda 11$, $\lambda 24$, $\lambda 32$, and $\lambda 43$ may be replaced by $\lambda 1$, and $\lambda 13$, $\lambda 22$, $\lambda 34$ and $\lambda 41$ may be replaced by $\lambda 2$, etc. Note also, only N−1 wavelengths are needed for node interconnection. The extra wavelength $\lambda jj$ of each node can be used for control information or other purposes. In alternative embodiments of the invention, the number of wavelengths assigned by a particular transmitting system to the dedicated connection with a particular receiving system may be greater than one depending on the required throughput and traffic fluxuations. For example, the traffic volume might be such that two or more wavelengths have to be allocated to the connection between one particular pair of nodes.

The wavelength division multiplexers and demultiplexers in the network of FIG. 1 may be based on diffraction gratings so as to obtain relatively dense channel spacings. Diffraction gratings are currently used for multiplexing/demultiplexing with the following characteristics: up to 50 channels, larger than 1 nm channel spacing, less than 5 dB loss and more than 20 dB cross talk isolation. Such multiplexer/demultiplexers are disclosed in J. P. Laude and J. M. Lerner "Wavelength Division Multiplexing/Demultiplexing (WDM) Using Diffraction Gratings" Proc. SPIE Vol. 503, pp. 22–28, Aug. 1986, San Diego, and N. A. Olsson, et al. "63.3 km Transmission with 1.37 Tbit km/s. Capacity Using Wavelength Division Multiplexing of Ten Single-Frequency at 1.5 $\mu$m", Elect. Lett. Vol. 21, pp. 105–106, 1985. The feasibility of dense WDM is greatly enhanced by the existence of single-longitudinal mode lasers with very well defined and reproducible (to-1 nm) center wavelengths. See e.g., H. Okuda et al. "Wavelength Controllability of VPE Grown 1.3 $\mu$m DFB Lasers for Wavelength Multiplexing Optical Fiber Communication," IOOC-ECOC Tech. Digest, Vol. 1, pp. 29–32, October 1985, Venice, Italy.

Because the object of the inventive network of FIG. 1 is to provide high bit rate dedicated point-to-point connections between nodes, no mechanism for rearranging connections is shown in FIG. 1. In alternative embodiments of the invention, the hub may be made rearrangeable either manually or with a slow optical (e.g., LiNbO$_3$) cross connect system. See e.g., P. Granestrand, et al. "Strictly Nonblocking 8×8 Integrated-Optic Switch Matrix in Ti:LiNbO$_3$" Integrated and Guided-Wave Optics, Tech Digest, pp. 4–5, Feb. 1986, Atlanta. On the other hand, if no rearrangability is required, all the demultiplexers and multiplexers at the hub can be formed using a single diffraction grating element made by multiple exposure holographic techniques.

To review briefly, an all optical wavelength division multiplexing structure for establishing high bit rate dedicated point-to-point connections between the nodes of a telecommunications network has been disclosed. The structure does not require electronic switching of high bit rate channels nor does it require the massive deployment of fiber optic links. In addition, the wavelength division multiplexing structure is transparent to data structure. Thus, different data rates and formats may be accommodated. Because, the inventive structure is designed primarily to satisfy high capacity, dedicated connection requirements, it may be deployed along with other types of structures capable of handling switched channels. For example, a central hub may be developed comprising an electronic switch capable of handling a number of relatively narrow bandwidth switched channels and the wavelength division multiplexing structure disclosed herein for providing dedicated point-to-point high bandwidth channels. Thus, the WDM structure of the present invention can be utilized in a network capable of supporting a plurality of dedicated high capacity point-to-point links as well as some links that are electronically switched at the central hub.

Finally, the above-described embodiments of the invention are intended to be illustrative only. Numerous alternative embodiments may be devised by those skilled in the art, without departing from the spirit and scope of the following claims.

What is claimed is:

1. A wavelength division multiplexing structure for providing dedicated point-to-point connections between nodes in an optical telecommunications network, said structure comprising:
   wavelength division demultiplexing means for receiving multiple wavelength radiation from each of said nodes and for separating said received radiation into constituent wavelengths so that said wavelengths are organized according to node of origin, each individual wavelength from each node being capable of carrying information destined for one specific destination node,
   passive optical means for rearranging said wavelengths so that wavelengths having a common destination node are grouped together, and
   wavelength division multiplexing means for multiplexing together wavelengths having the same destination node.

2. The structure of claim 1 wherein said wavelength division demultiplexing means and said wavelength division multiplexing means comprise optical diffraction gratings.

3. An optical telecommunications network comprising
   a plurality of nodes, each of said nodes including a transmitting system and a receiving system, and a central hub for providing dedicated connections between particular transmitting systems and receiving systems,
   each of said transmitting systems including means for producing radiation comprising a plurality of wavelengths for carrying data destined for particular receiving systems and means for wavelength division multiplexing said wavelengths, each individual wavelength produced by each transmitting system carrying data destined for one particular receiving system, and
   said hub including means for receiving said multiplexed radiation from said transmitting systems and for demultiplexing said received multiplexed radiation, passive optical means for rearranging said demultiplexed radiation so that wavelengths having a common destination receiving system are grouped together and means for wavelength division multiplexing all wavelengths destined for the same receiving system.

4. The network of claim 3 wherein said network comprises N nodes and each of said transmitting systems produces a plurality of wavelengths comprising a maximum of N distinct wavelengths.

5. The network of claim 4 wherein each of said pluralities comprises the same wavelengths.

6. The network of claim 5 wherein said wavelength division multiplexing means and said wavelength division demultiplexing means are formed from identical diffraction grating elements.

7. The network of claim 3 wherein said demultiplexing means in said hub and said transmitting systems are connected by first optical fiber links.

8. The network of claim 7 wherein said multiplexing means in said hub and said receiving systems are connected by second optical fiber links, and wherein each of said receiving systems comprises means for wavelength division demultiplexing radiation received from said hub.

9. The network of claim 3 wherein said network comprises N nodes and N−1 distinct wavelengths are utilized to achieve said connections between pairs of said nodes.

10. A method for transporting data by way of dedicated point-to-point connections between nodes in an optical telecommunications network, comprising the steps of, at each node, placing data on a plurality of optical wavelengths according to destination node and wavelength division multiplexing said wavelengths for transmission to a hub, and at said hub, wavelength division demultiplexing radiation received from said nodes so that said wavelengths are grouped according to node of origin, passively optically rearranging said wavelengths so that wavelengths having a common destination node are grouped together, and wavelength division multiplexing all of said wavelengths having the same destination node.

11. The method of claim 10, wherein said method further comprises the steps of:

at each node, receiving wavelength multiplexed radiation from said hub and demultiplexing said received radiation.

* * * * *